United States Patent

Honda

[11] Patent Number: 5,779,261
[45] Date of Patent: Jul. 14, 1998

[54] VEHICLE AIR BAG RETAINING ARRANGEMENT

[75] Inventor: Kiyoshi Honda, Saitama-ken, Japan

[73] Assignee: Honda Giken Kogyo Kabushiki Kaisha, Tokyo, Japan

[21] Appl. No.: 745,481

[22] Filed: Nov. 12, 1996

[30] Foreign Application Priority Data

Nov. 20, 1995 [JP] Japan .................................. 7-326357

[51] Int. Cl.$^6$ .................................................. B60R 21/20
[52] U.S. Cl. .................................. 280/728.2; 280/728.3; 280/731
[58] Field of Search ............................. 280/728.3, 728.2, 280/730.1, 730.2, 731, 732, 728.1

[56] References Cited

U.S. PATENT DOCUMENTS

| | | | |
|---|---|---|---|
| 4,989,897 | 2/1991 | Takada | 280/728.3 |
| 5,468,012 | 11/1995 | Mihm | 280/728.2 |
| 5,498,030 | 3/1996 | Hill et al. | 280/728.2 |
| 5,562,301 | 10/1996 | Lutz | 280/728.2 |
| 5,568,936 | 10/1996 | Spilker et al. | 280/728.2 |

FOREIGN PATENT DOCUMENTS

| | | | |
|---|---|---|---|
| 447030 | 9/1991 | European Pat. Off. | 280/728.2 |

*Primary Examiner*—Peter C. English
*Attorney, Agent, or Firm*—Armstrong, Westerman, Hattori, McLeland & Naughton

[57] ABSTRACT

An inflator and an air bag are received in a plastic cover which comprises a pair of retainer sections which are connected to opposing edges of the cover by plastic hinges so that free ends of the retainer sections are jointly attached to a fixed part of the vehicle body. Preferably, the inflator is received in a gas-permeable and flexible retainer bag which is placed inside the air bag, and provided with a tubular section having a rod member passed through the tubular section along with holes provided in a fixed part of the vehicle body. The free ends of the retainer sections may be provided with tabs which can mutually interdigitate, and an inwardly concave semi-cylindrical profile positioned centrally of the cover adapted to be placed against the rod member. Thus, the inflator can be secured to the fixed part of the vehicle body in a reliable manner without requiring any mechanical fasteners. To securely join the air bag to the inflator, an open end of the air bag may be sewn or otherwise attached to a part of the retainer bag adjacent to the tubular section.

8 Claims, 3 Drawing Sheets

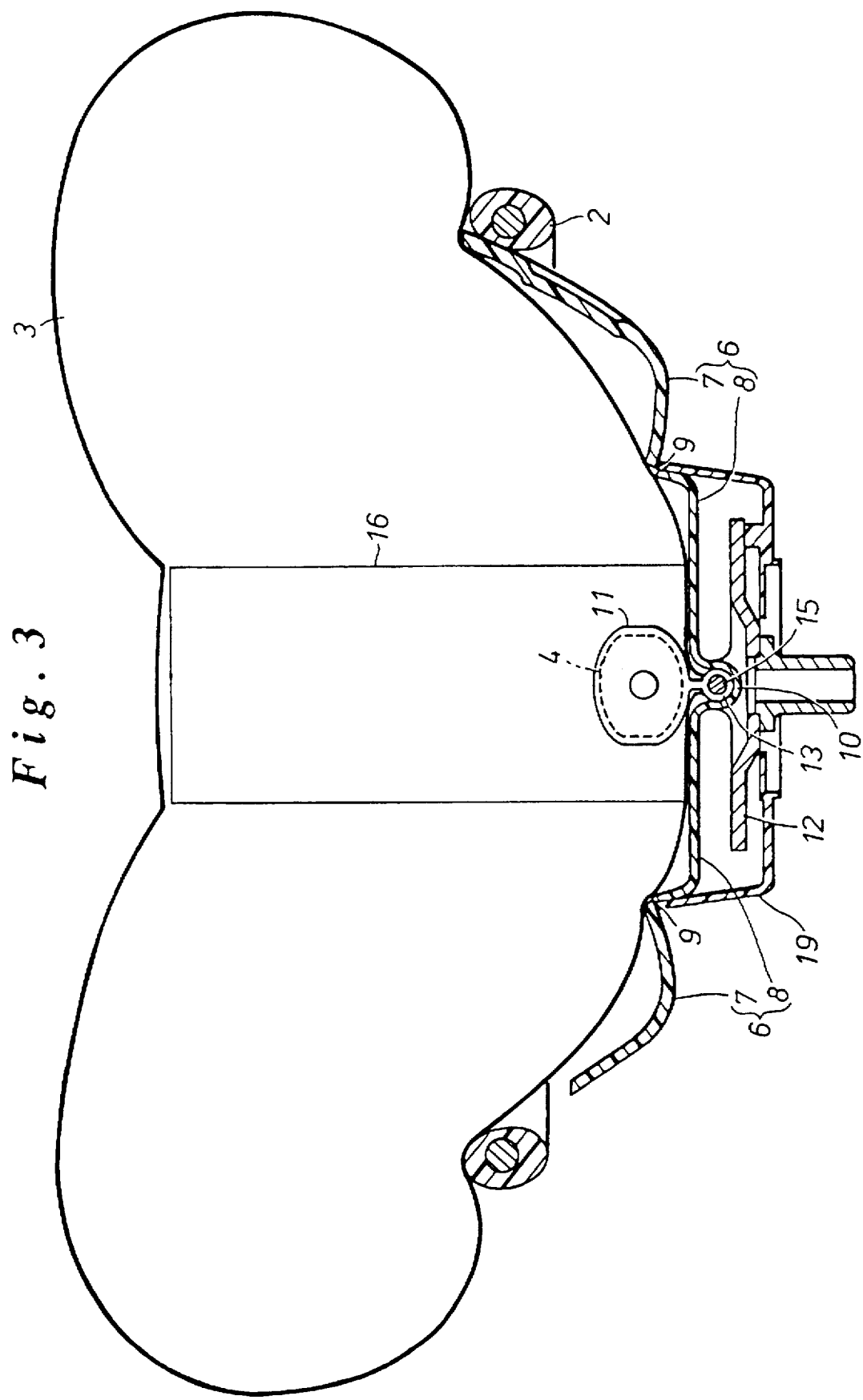

VEHICLE AIR BAG RETAINING ARRANGEMENT

TECHNICAL FIELD

The present invention relates to a vehicle air bag system for restraining a vehicle occupant at the time of a vehicle crash and other high deceleration situations, and in particular to an improved arrangement for retaining an air bag/inflator assembly of a vehicle air bag system.

BACKGROUND OF THE INVENTION

To protect a vehicle occupant from the impact of a vehicle crash, air bag systems are increasingly widely installed in motor vehicles. Typically, such an air bag system is incorporated with an air bag, and an inflator for producing the gas required for inflating the air bag. The air bag is compactly folded and stowed in the center of the steering wheel or in the dashboard which is located immediately in front of the vehicle occupant. Once the air bag is deployed and has successfully restrained the vehicle occupant, it is immediately deflated so that the vehicle occupant may not be excessively thrown back, and may be allowed to get out of the vehicle.

The inflator contains a propellant which, upon ignition, rapidly burns and produces the gas required for rapidly deploying the air bag. Typically, the air bag along with the inflator is received in a cover made of plastic material, and is attached to the corresponding part of the vehicle body via a suitable retainer. The retainer is therefore required to secure the inflator against the forces acting on it. These forces include the reaction force which acts on the inflator as it ejects the gas for inflating the air bag, and the force which the air bag applies to the inflator as it is deployed and hit against the vehicle occupant. The retainer is also required to withstand the heat which is produced from the inflator.

If the retainer lacks the mechanical strength, part of the gas produced from the inflator may leak out, and the air bag may fail to be deployed in a satisfactory manner. Therefore, it has been customary to form the retainer with a metallic member.

The use of a metallic member is obviously detrimental to the reduction in the weight of the vehicle. Additionally, the need for fastening means such as rivets and threaded bolts for securing the retainer to the cover main body tends to complicate the design and the assembly work as they are made of two different materials.

BRIEF SUMMARY OF THE INVENTION

In view of such problems of the prior art, a primary object of the present invention is to provide a retaining arrangement for a vehicle air bag system which is economical to manufacture and reliable in use.

A second object of the present invention is to provide a retaining arrangement for a vehicle air bag system which is light in weight and compact in size.

According to the present invention, these and other objects can be accomplished by providing an arrangement for retaining a vehicle air bag system, comprising: a cover adapted to be mounted to a part of a vehicle body such as a central part of a steering wheel and a dashboard panel; an inflator received inside the cover for producing gas upon activation; and an air bag received inside the cover adapted to be inflated by the gas produced from the inflator; wherein a pair of retainer sections are attached to opposing edges of the cover by hinge means so that free ends of the retainer sections are jointly attached to a fixed part of the vehicle body. Preferably, the retainer sections are integrally molded with the cover, and the hinge means each consist of a linear thinned wall part of the cover.

Therefore, the air bag and the inflator can be enclosed in the cover without requiring any mechanical fastening means such as threaded bolts or rivets. In particular, by providing a laterally extending rod member in the fixed part of the vehicle body and forming the free ends of the retainer such that they jointly define an inwardly concave semi-cylindrical profile which is adapted to receive the rod member, it is possible to retain the cover to the fixed part of the vehicle both easily and securely. Preferably, the free ends of the retainer sections are provided with tabs which can mutually interdigitate. To secure the cover against the impact of deploying the air bag, the free ends of the retainer sections jointly defining the inwardly concave semi-cylindrical profile is preferably positioned centrally of the cover.

According to a particularly preferred embodiment of the present invention, the inflator is received in a gas-permeable and flexible retainer bag which is placed inside the air bag, and provided with a tubular section having the rod member passed therethrough. Thus, the inflator can be secured to the fixed part of the vehicle body in a reliable manner without requiring any mechanical fastening means. To securely join the air bag to the inflator, an open end of the air bag may be sewn or otherwise attached to a part of the retainer bag adjacent to the tubular section.

BRIEF DESCRIPTION OF THE DRAWINGS

Now the present invention is described in the following with reference to the appended drawings, in which:

FIG. 3 is a view similar to FIG. 2 showing the retaining arrangement when the air bag is fully deployed.

DETAILED DESCRIPTION OF THE PREFERRED EMBODIMENTS

Figure 1:
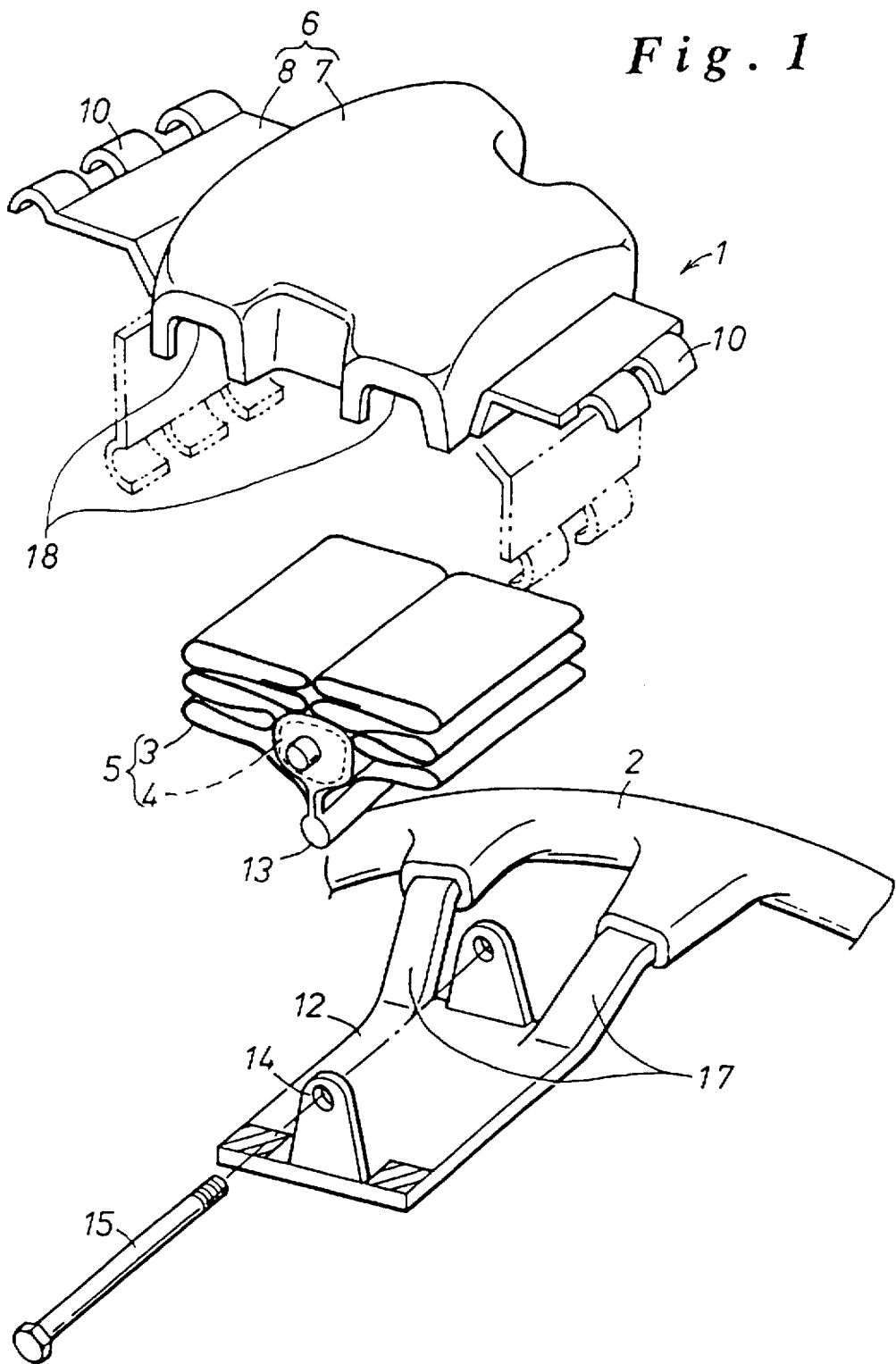
FIG. 1 is an exploded perspective view of a retaining arrangement for a vehicle air bag system according to the present invention.
Figure 2:
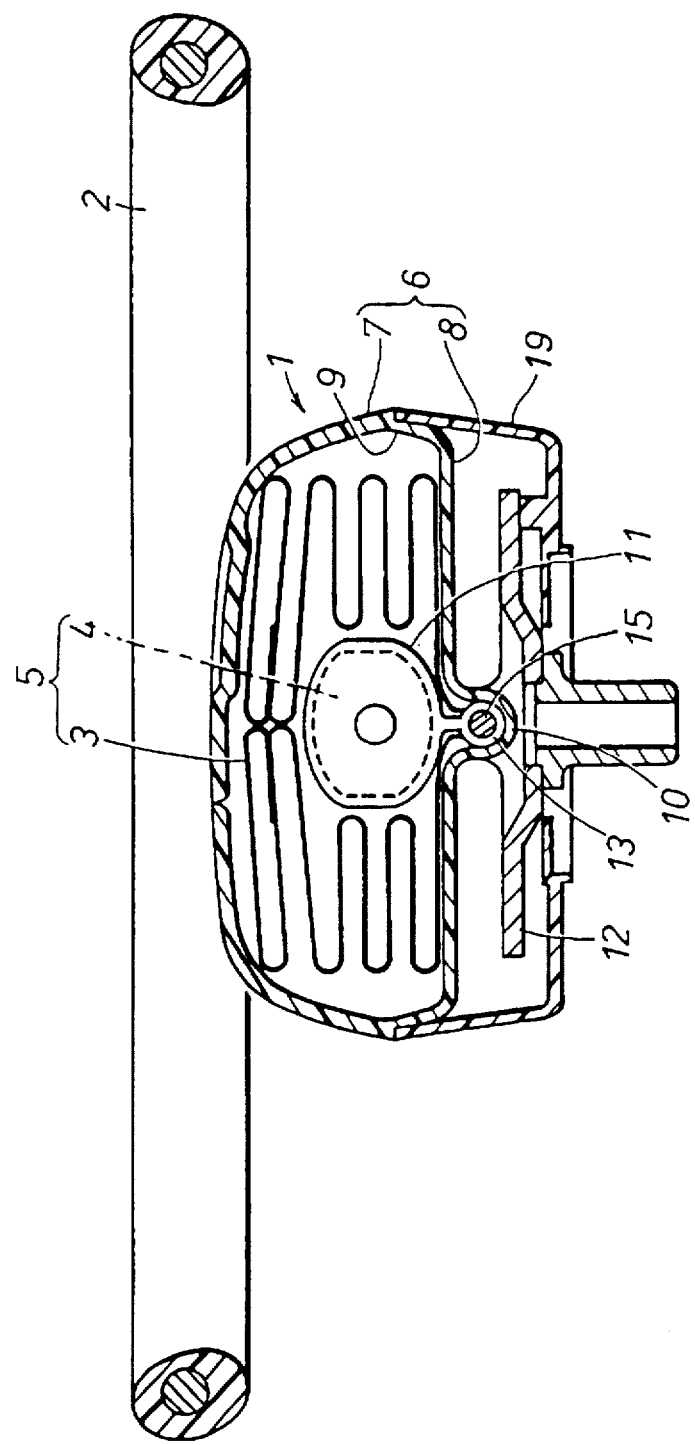
FIG. 2 is a sectional view of the retaining arrangement of FIG. 1 under normal condition.

Referring to FIGS. 1 and 2, an air bag system 1 according to the present invention is installed in a central part of a steering wheel 2. However, the air bag system 1 can be also installed in other parts of the vehicle body, such as a dashboard. This air bag system 1 essentially consists of an air bag/inflator assembly 5 including an air bag 3 typically made of nylon fabric lined with neoprene, and an inflator 4 received in the air bag 3 for producing the gas required for inflating the air bag 3, and a cover 6 made of plastic material enclosing this air bag/inflator assembly 5.

The cover 6 serves the dual purpose of the center pad for the steering wheel 2, and consists of a case section 7 having an inverted cup-shape, and a pair of retainer sections 8 including a pair of planar members extending from the lower edges of the case section 7. The cover 6 is integrally molded by injection molding from relatively rigid urethane resin. The case section 7 is provided with a notch extending on a front wall thereof so as to be ruptured along this notch when the air bag 3 is deployed.

The retainer sections 8 are attached to the corresponding edges of the case section 7 via plastic hinges 9 so as to be freely pivotable around these hinges 9, and the free end of each of the retainer sections 8 is provided with tangs or tabs 10 which are adapted to be interdigitate with those on the edge of the opposing retainer section 8. The plastic hinges 9 each essentially consist of a linear thinned portion of the wall of the cover 6. Numeral 19, FIG. 2, denotes a cup-shaped housing which is secured to a central part of the steering wheel 2, and encloses the center hub 12. The upper edge of the housing 19 abuts a corresponding shoulder surface defined along the part of the cover adjoining the hinges 9 so as to jointly define a smooth outer profile.

The shape of the cover 6 at the time of the molding process may be such that the retainer sections 8 extend laterally from the lower edges of the case section 7 as indicated by the solid lines in FIG. 1 or alternatively such that the retainer sections 8 depend from the upper and lower edges of the case section 7 as indicated by the imaginary lines in FIG. 1. Either one of the possible configurations may be selected according to the convenience of designing the die assembly for injection molding the cover 6. The case section 7 is provided with four recesses 18 for receiving spokes 17 of the steering wheel 2.

Typically, the inflator 4 consists of a tubular container made of aluminum alloy and fitted with a propellant for producing the gas required for deploying the air bag. The inflator 4 is received in a gas permeable, and heat-resistant retainer bag 11 which is provided with a tubular section 13 for attaching the inflator 4 to a center hub 12 of the steering wheel 2. An open end of the air bag 3 is sewn to a part of the resistant retainer bag 11 adjacent to the tubular section 13 thereof, and the air bag 3 which is in effect attached to the inflator 4 is received inside the cover 6 in a closely folded state.

When assembling the air bag system 1 to the steering wheel 2, the air bag/inflator assembly 5 is first installed inside the case section 7, and the retainer sections 8 are folded toward each other until the tangs 10 projecting therefrom are mutually interdigitated. These tangs 10 as well as the adjoining parts of the retainer sections 8 may be joined together by using a suitable bonding agent. An engagement pin or laterally extending rod member 15 is passed through a pair of pin journals 14 provided in the center hub 12 of the steering wheel 2, and the tubular section 13 of the retainer bag 11. As a result, a semi-cylindrical surface defined by the mutually interdigitated tangs 10 is placed against the engagement pin 15 with the tubular section 13 of the retainer bag 11 interposed therebetween. Thus, the air bag 3 and the inflator 4 are securely attached to the steering wheel 2.

The operation of the air bag system according to the present invention is now described in the following, additionally with reference to FIG. 3.

When a vehicle crash is detected by a deceleration sensor not shown in the drawings, the propellant inside the inflator 4 is ignited, and the resulting combustion gas is introduced into the air bag 3. As a result, the air bag 3 is inflated, and the front wall of the case section 7 is ruptured. A plurality of tie strings 16 extend across the opposing walls of the air bag 3 so as to define the shape of the air bag 3 in its fully inflated state.

Once the air bag 3 is deployed, and the vehicle occupant is successfully restrained, the gas is released from a vent hole formed in the air bag 3, and the air bag 3 is immediately deflated so as not to prevent the vehicle occupant from moving out of the vehicle.

Thus, by placing the retainer sections 8, which are integrally formed with the cover 6, between the air bag 3 and the center hub 12 of the steering wheel 2, it is possible to avoid the air bag 3 from being interfered by the center hub 12 or other components attached thereto as the air bag 3 is deployed, and hence it is possible to avoid the air bag 3 from being damaged.

Particularly when the cover and the retainer sections are integrally molded as a single molded member, the assembling process can be drastically simplified. Furthermore, by securing the inflator and/or the air bag substantially directly to the center hub or other fixed part of the vehicle body, a required mechanical strength can be achieved with a highly light-weight structure with a minimum expense.

Although the present invention has been described in terms of preferred embodiments thereof, it is obvious to a person skilled in the art that various alterations and modifications are possible without departing from the scope of the present invention which is set forth in the appended claims.

What we claim is:

1. A retaining arrangement for a vehicle air bag system comprising:
   a cover for mounting on a fixed part of a vehicle body, said fixed part located on one of a steering wheel, a dashboard panel or other fixed panel to be shielded from impact upon impact of the vehicle;
   an inflator received inside said cover for producing gas upon activation; and
   an air bag received inside said cover for inflation by said gas produced from said inflator;
   wherein a pair of retainer sections are attached to opposite edges of said cover by hinge means so that free ends of said retainer sections are jointly attached to said fixed part of said vehicle body and
   said free ends of said retainer sections are provided with tabs which can mutually interdigitate.

2. A retaining arrangement for a vehicle air bag system according to claim 1, wherein said fixed part of said vehicle body comprises a laterally extending rod member, and said free ends of said retainer sections jointly define an inwardly concave semi-cylindrical profile which is adapted to receive said rod member.

3. A retaining arrangement for a vehicle air bag system according to claim 1, wherein said free ends of said retainer sections jointly defining the inwardly concave semi-cylindrical profile are positioned centrally of said cover.

4. A retaining arrangement for a vehicle air bag system according to claim 1, wherein said inflator is received in a gas-permeable and flexible retainer bag which is placed inside said air bag, and provided with a tubular section having said rod member passed therethrough.

5. A retaining arrangement for a vehicle air bag system according to claim 4, wherein an open end of said air bag is attached to a part of said retainer bag adjacent to said tubular section.

6. A retaining arrangement for a vehicle air bag system according to claim 1, wherein said inflator is received inside said air bag.

7. A retaining arrangement for a vehicle air bag system according to claim 1, wherein said inflator is attached to said fixed part of the vehicle body.

8. A retaining arrangement for a vehicle air bag system according to claim 1, wherein said retainer sections are integrally molded with said cover, and said hinge means each consist of a linear thinned wall part of said cover.

* * * * *